H. RACINE.
Wagon Brake.
No. 105,845.                                   Patented July 26, 1870.
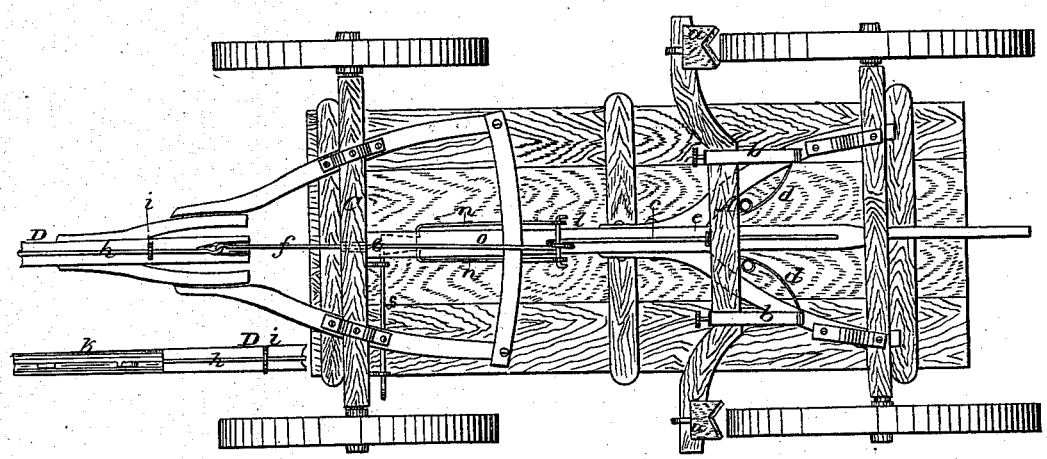
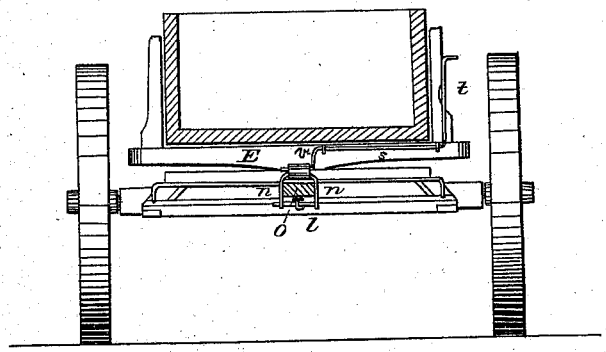

United States Patent Office.

HENRY RACINE, OF PAOLA, KANSAS.

Letters Patent No. 105,845, dated July 26, 1870.

---

IMPROVEMENT IN BRAKE FOR WAGONS.

---

The Schedule referred to in these Letters Patent and making part of the same.

---

*To all whom it may concern:*

Be it known that I, HENRY RACINE, of Paola, in the county of Miami and State of Kansas, have invented a new and improved Wagon-Brake; and I do hereby declare the following to be a full, clear, and exact description of the same, reference being had to the accompanying drawing making a part of this specification, in which—

Figure 1 is a plan view of the lower side of the wagon, showing the brake mechanism, and Figure 2 is a transverse vertical section.

This invention relates to a brake apparatus, which is connected with the neck-yoke of the draft animals by a rod running forward under the tongue, and is operated by the rearward movement given to the said connecting-rod by the holding back of the animals, when going down hill, there being also in the combination a mechanism for preventing the application of the brakes when the animals are backing, by which mechanism, also, the brakes may be applied independently of the said connecting-rod.

In the drawing—

A is a brake-bar.

$a\ a$, the rubbers.

$b\ b$, the holders of the brake-bar.

$c$, a rod placed lengthwise beneath the wagon-body B, passing loosely through the center of the brake-bar, and extending some distance in rear of the same, so as to admit of being drawn forward when it is desirable to increase the distance between the front and rear axles.

$d\ d$ are springs, by which the brake-bar is kept clear of the wheels, except when pressed backward.

$e$ is a button on the rod $c$, in front of the brake-bar, which button moves the brake-bar backward when forced against it.

$f$ is a rod, jointed at its rear extremity to the front end of the rod $c$, passing loosely through the front axle C, and jointed at its forward extremity to the hinder end of a rod, $h$, which runs forward beneath the tongue D, being upheld in straps $i$, and is connected, at its front end, with a ferrule, $k$, which slides on the tongue. The holding back of the animals slides the ferrule $k$ to rear, and applies the brake to the wheels through the medium of the mechanism above described.

When the animals are backing, it is desirable to prevent the application of the brakes. For this purpose, a pin, $l$, is placed crosswise of the rod $c$, in a slot of the latter, and is jointed at both ends to rods $n\ n$, which extend forward, one at each side of the coupling-bar $o$, and are connected, at their front ends, with a crank, $r$, on a bar, $s$, which is mounted in eyes that are secured in the front bolster E.

$t$ is a handle which projects upward from the bar $s$, so as to be within easy reach of one sitting in the wagon-box. If the handle $t$ be thrown backward, it draws the pin $l$ forward to the end of the slot, and the pin consequently receives the rearward thrust of the rod $c$. If the handle $t$ be left upright, the slot allows the bar $c$ sufficient play to apply the brakes. If the handle $t$ be thrown forward, it moves the pin $l$ backward so far as to cause it to apply the brakes. Hence, the handle $t$ is used, in ascending hills, when the wagon is halted, and must be prevented from moving backward.

Having thus described my invention,

What I claim as new, and desire to secure by Letters Patent, is—

The brake-bar A, provided with the rubbers $a\ a$, and combined with the sliding rod $c$, provided with the button $e$, the jointed rods $f\ h$, the sliding ferrule $k$, the pin $l$, connecting-rods $n\ n$, crank-bars $s$, and handle $t$, in the manner and for the purpose specified.

HENRY RACINE.

Witnesses:
J. P. HINER,
WM. B. BRAYMAN.